United States Patent
Selvaganapathy et al.

(10) Patent No.: US 12,414,169 B2
(45) Date of Patent: Sep. 9, 2025

(54) COMMUNICATION OF USER TERMINAL HAVING MULTIPLE SUBSCRIPTION IDENTITIES

(71) Applicant: NOKIA TECHNOLOGIES OY, Espoo (FI)

(72) Inventors: Srinivasan Selvaganapathy, Bangalore (IN); Faranaz Sabouri-Sichani, Aalborg (DK); Nuno Manuel Kiilerich Pratas, Gistrup (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 89 days.

(21) Appl. No.: 18/001,229

(22) PCT Filed: Jun. 8, 2021

(86) PCT No.: PCT/IB2021/055003
§ 371 (c)(1),
(2) Date: Dec. 8, 2022

(87) PCT Pub. No.: WO2021/255577
PCT Pub. Date: Dec. 23, 2021

(65) Prior Publication Data
US 2023/0239941 A1  Jul. 27, 2023

(30) Foreign Application Priority Data
Jun. 15, 2020 (EP) .................................... 20179968

(51) Int. Cl.
*H04W 76/11* (2018.01)
*H04W 88/06* (2009.01)

(52) U.S. Cl.
CPC ............ *H04W 76/11* (2018.02); *H04W 88/06* (2013.01)

(58) Field of Classification Search
CPC ..... H04W 68/00; H04W 76/15; H04W 8/183; H04W 8/08; H04W 8/10; H04W 12/068;
(Continued)

(56) References Cited

U.S. PATENT DOCUMENTS 9,491,276 B2 * 11/2016 Kanamarlapudi ... H04B 1/3816
10,021,559 B2 * 7/2018 Faccin ................ H04L 65/1066
(Continued)

FOREIGN PATENT DOCUMENTS

CN 107432052 A 12/2017
CN 110249709 A 9/2019
(Continued)

OTHER PUBLICATIONS

E. Pencheva and I. Atanasov, "An Extension of Radio Network Information Interfaces for Terminal Activity in a Cell," 2018 9th IFIP International Conference on New Technologies, Mobility and Security (NTMS), Paris, France, 2018, pp. 1-5, doi: 10.1109/NTMS.2018.8328680. (Year: 2018).*
(Continued)

*Primary Examiner* — William D Cumming
(74) *Attorney, Agent, or Firm* — Lippes Mathias LLP

(57) ABSTRACT

Apparatuses and methods in a communication system are provided. A first radio resource connection, RRC, with a Radio Access Network, RAN, node is established (502) by a device, the connection having a first Radio Network Temporary Identifier and being associated with a first subscription identity. An RRC setup procedure for establishing a second RRC is performed (504), the connection being associated with a second subscription identity. During or after the RRC setup it is indicated to the RAN node that the device has an existing radio resource connection with the node. A second Radio Network Temporary Identifier associated with the second radio resource connection and an
(Continued)

additional Radio Network Temporary Identifier common to the first and second radio resource connections are received (506) and the common Identifier is used (508) for communication with the RAN node.

11 Claims, 12 Drawing Sheets

(58) Field of Classification Search
CPC ......... H04W 60/00; H04W 8/22; H04W 8/26; H04W 72/0466; H04W 72/20; H04W 76/10
USPC .................................. 455/450, 458; 370/328
See application file for complete search history.

(56) References Cited

U.S. PATENT DOCUMENTS

| | | | |
|---|---|---|---|
| 10,244,381 B2* | 3/2019 | Faccin ................ | H04W 12/068 |
| 10,660,057 B2* | 5/2020 | Khan .................... | H04W 60/00 |
| 10,812,629 B2* | 10/2020 | Park ........................ | H04W 8/08 |
| 10,855,814 B2* | 12/2020 | Park ........................ | H04W 8/08 |
| 11,375,470 B2* | 6/2022 | Zhu ........................ | H04W 8/22 |
| 11,582,330 B2* | 2/2023 | Park ...................... | H04L 69/321 |
| 11,606,807 B2* | 3/2023 | Lei ......................... | H04W 72/20 |
| 11,849,009 B2* | 12/2023 | Park .................. | H04W 36/0088 |
| 11,882,610 B2* | 1/2024 | Purkayastha ......... | H04W 76/15 |
| 11,991,711 B2* | 5/2024 | Takahashi ......... | H04W 72/0466 |
| 12,035,299 B2* | 7/2024 | Purkayastha ......... | H04W 76/10 |
| 2007/0259675 A1* | 11/2007 | Worrall ................ | H04W 68/00 455/458 |
| 2014/0120925 A1* | 5/2014 | Kanthala .............. | H04W 76/15 455/450 |
| 2014/0286243 A1 | 9/2014 | Yamada | |
| 2016/0095157 A1 | 3/2016 | Wenzel et al. | |
| 2016/0219475 A1 | 7/2016 | Kim | |
| 2016/0301790 A1* | 10/2016 | Kanamarlapudi .... | H04W 8/183 |
| 2017/0041776 A1* | 2/2017 | Faccin ................ | H04W 12/068 |
| 2018/0295499 A1* | 10/2018 | Faccin ................ | H04W 12/068 |
| 2019/0090280 A1 | 3/2019 | Krishnamoorthy et al. | |
| 2020/0412842 A1* | 12/2020 | Park ...................... | H04W 80/10 |
| 2021/0084121 A1* | 3/2021 | Park ...................... | H04W 76/15 |
| 2021/0282103 A1* | 9/2021 | Zhu ........................ | H04W 76/15 |
| 2021/0289534 A1* | 9/2021 | Lei ......................... | H04W 72/20 |
| 2021/0360678 A1* | 11/2021 | Takahashi ......... | H04W 72/0466 |
| 2022/0053520 A1* | 2/2022 | Purkayastha ......... | H04W 72/1263 |
| 2022/0053586 A1* | 2/2022 | Purkayastha ......... | H04W 76/11 |
| 2023/0224380 A1* | 7/2023 | Park .................. | H04W 36/0005 370/331 |
| 2023/0239941 A1* | 7/2023 | Selvaganapathy ...... | H04W 8/26 370/328 |
| 2024/0146827 A1* | 5/2024 | Park .................. | H04W 36/0005 |

FOREIGN PATENT DOCUMENTS

| | | |
|---|---|---|
| EP | 2787658 A1 | 10/2014 |
| JP | 2020-505871 A | 2/2020 |
| WO | 2015/141844 A1 | 9/2015 |
| WO | 2016/191916 A1 | 12/2016 |
| WO | 2017/139943 A1 | 8/2017 |
| WO | 2018/141081 A1 | 8/2018 |
| WO | 2018/141148 A1 | 8/2018 |

OTHER PUBLICATIONS

"3rd Generation Partnership Project; Technical Specification Group Radio Access Network; NR; Multiplexing and channel coding (Release 16)", 3GPP TS 38.212, V16.0.0, Dec. 2019, pp. 1-145.

"3rd Generation Partnership Project; Technical Specification Group Radio Access Network; NR; Physical layer procedures for control (Release 16)", 3GPP TS 38.213, V16.0.0, Dec. 2019, pp. 1-146.

"3rd Generation Partnership Project; Technical Specification Group Radio Access Network; NR; Physical layer procedures for data (Release 16)", 3GPP TS 38.214, V16.0.0, Dec. 2019, pp. 1-147.

"3rd Generation Partnership Project; Technical Specification Group Radio Access Network; NR; Medium Access Control (MAC) protocol specification (Release 15)", 3GPP TS 38.321, V15.8.0, Dec. 2019, pp. 1-78.

"Revised SID: Study on system enablers for multi-SIM devices", TSG SA Meeting #SP-83, SP-190248, Agenda Item: 17B.19, SA WG2, Mar. 20-22, 2019, 4 pages.

"3rd Generation Partnership Project; Technical Specification Group Services and System Aspects; Study on Support for Multi-USIM Devices (Release 17)", 3GPP TR 22.834, V17.2.0, Dec. 2019, pp. 1-17.

"3rd Generation Partnership Project; Technical Specification Group Services and System Aspects; Study on system enablers for devices having multiple Universal Subscriber Identity Modules (USIM) (Release 17)", 3GPP TR 23.761, V0.3.0, pp. 1-37.

"New WID: Support for Multi-SIM devices in Rel-17", 3GPP TSG RAN Meeting #86, RP-193263, Agenda Item: 9.1.2, vivo, Dec. 9-12, 2019, 5 pages.

"FS_MUSIM Work Tasks", 3GPP SA TSG Meeting #86, SP-191353, Intel, Dec. 9-13, 2019, pp. 1-2.

"3rd Generation Partnership Project; Technical Specification Group Radio Access Network; NR; NR and NG-RAN Overall Description; Stage 2 (Release 15)", 3GPP TS 38.300, V15.4.0, Dec. 2018, pp. 1-97.

"Motivation for SI on multi-SIM devices in RAN", 3GPP TSG RAN Meeting #83, RP-190248, Agenda item: 9.1.2, China Telecom, Mar. 18-21, 2019, 3 pages.

Notice of Allowance received for corresponding European Patent Application No. 20179968.1, dated Nov. 8, 2022, 8 pages.

Office Action received for corresponding Japanese Patent Application No. 2022-577242, dated Apr. 25, 2024, 3 pages of Office Action and 4 pages of summary and translation available.

International Search Report and Written Opinion for PCT Application No. PCT/IB2021/055003, mailed on Jul. 9, 2021, 16 pages.

3GPP TSG RAN WG1 Meeting 91, R1-1720825; "Remaining Issues on Bandwidth Parts for NR"; Source: NTT Docomo, Inc.; Agenda Item: 7.3.4.1; Reno, Nevada, USA; Nov. 27-Dec. 1, 2017, 3 pages.

3GPP TSG-RAN WG3 Meeting #55, R3-070398; "Stage-3 Proposal for Enhanced Cell_FACH"; Agenda item: 13.3; Source: Nokia, Siemens; St Louis, Missouri, USA; Feb. 12-16, 2007; 15 pages.

European Search Report for Application No. 20179968.1, mailed on Dec. 4, 2020, 9 pages.

Decision of Rejection received for corresponding Japanese Patent Application No. 2022-577242, dated Oct. 22, 2024, 2 pages of Decision of Rejection and 3 pages of summary/translation available.

Office action received for corresponding Chinese Patent Application No. 202180042716.6, dated May 24, 2025, 8 pages of Office action and no page of translation available.

* cited by examiner

COMMUNICATION OF USER TERMINAL HAVING MULTIPLE SUBSCRIPTION IDENTITIES

CROSS-REFERENCE TO RELATED APPLICATIONS

This application is a national stage entry of International Application No. PCT/IB2021/055003, filed Jun. 8, 2021, entitled "COMMUNICATION OF USER TERMINAL HAVING MULTIPLE SUBSCRIPTION IDENTITIES" which claims the benefit of priority of European Application No. EP 20179968.1, filed Jun. 15, 2020, both of which are hereby incorporated by reference in their entireties.

FIELD

The exemplary and non-limiting embodiments of the invention relate generally to wireless communication systems. Embodiments of the invention relate especially to apparatuses and methods in wireless communication networks.

BACKGROUND

Wireless communication systems are under constant development. One aspect under development is user terminals having more than one subscription identities. There may be users who have the need to utilise more than one subscription in a same terminal. For example, one subscription maybe for home use and another for work. The communication system should be prepared to handle these situations in an efficient manner.

Wireless communication systems usually comprise wireless user terminals, a radio access network, and a core network. These components of the system exchange messages to establish signalling connections between them to facilitate data transfer from one communication point to another communication point. The exchange of signalling messages between different components of the system should be as reliable and efficient regarding the use of communication system resources as possible.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to a more detailed description that is presented later.

According to an aspect of the present invention, there are provided apparatuses.

According to an aspect of the present invention, there are provided methods.

According to an aspect of the present invention, there are provided computer programs comprising instructions.

One or more examples of implementations are set forth in more detail in the accompanying drawings and the description below. Other features will be apparent from the description and drawings, and from the claims. The embodiments and/or examples and features, if any, described in this specification that do not fall under the scope of the independent claims are to be interpreted as examples useful for understanding various embodiments of the invention.

LIST OF DRAWINGS

Embodiments of the present invention are described below, by way of example only, with reference to the accompanying drawings, in which FIGS. 1 and 2 illustrate examples of simplified system architecture of a communication system;

DESCRIPTION OF SOME EMBODIMENTS

The following embodiments are only examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may also contain features, structures, units, modules etc. that have not been specifically mentioned.

Some embodiments of the present invention are applicable to a user terminal, a communication device, a base station, eNodeB, gNodeB, a distributed realisation of a base station, a network element of a communication system, a corresponding component, and/or to any communication system or any combination of different communication systems that support required functionality.

The protocols used, the specifications of communication systems, servers and user equipment, especially in wireless communication, develop rapidly. Such development may require extra changes to an embodiment. Therefore, all words and expressions should be interpreted broadly and they are intended to illustrate, not to restrict, embodiments.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. The embodiments may also be applied to other kinds of communications networks having suitable means by adjusting parameters and procedures appropriately. Some examples of other options for suitable systems are the universal mobile telecommunications system (UMTS) radio access network (UTRAN), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
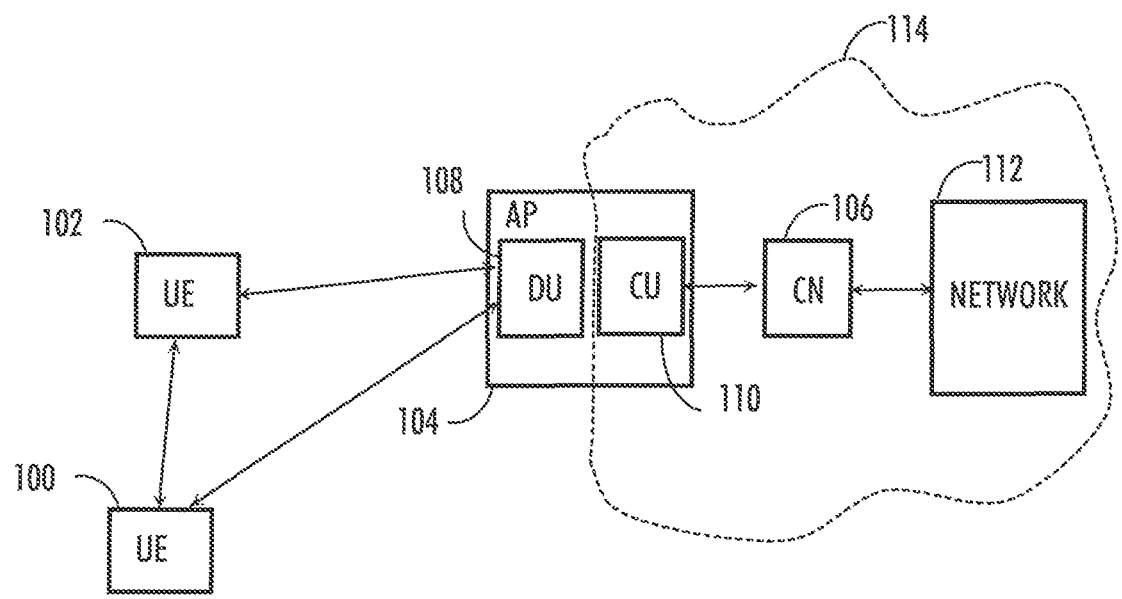

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows devices 100 and 102. The devices 100 and 102 may, for example, be user devices or user terminals. The devices 100 and 102 are configured to be in a wireless connection on one or more communication channels with a node 104. The node 104 is further connected to a core network 106. In one example, the node 104 may be an access node such as (e/g) NodeB serving devices in a cell. In one example, the node 104 may be a non-3GPP access node. The physical link from a device to a (e/g) NodeB is called uplink or reverse link and the physical link from the (e/g) NodeB to the device is called downlink or forward link. It should be appreciated that (e/g) NodeBs or their functionalities may be implemented by using any node, host, server or access point etc. entity suitable for such a usage.

A communications system typically comprises more than one (e/g) NodeB in which case the (e/g) NodeBs may also be configured to communicate with one another over links, wired or wireless, designed for the purpose. These links may be used for signalling purposes. The (e/g) NodeB is a computing device configured to control the radio resources of communication system it is coupled to. The NodeB may also be referred to as a base station, an access point or any other type of interfacing device including a relay station capable of operating in a wireless environment. The (e/g) NodeB includes or is coupled to transceivers. From the transceivers of the (e/g) NodeB, a connection is provided to an antenna unit that establishes bi-directional radio links to devices. The antenna unit may comprise a plurality of antennas or antenna elements.

The (e/g) NodeB is further connected to the core network 106 (CN or next generation core NGC). Depending on the system, the counterpart on the CN side can be a serving gateway (S-GW, routing and forwarding user data packets), packet data network gateway (P-GW), for providing connectivity of devices (UEs) to external packet data networks, or mobile management entity (MME), etc.

The device (also called a subscriber unit, user device, user equipment (UE), user terminal, terminal device, etc.) illustrates one type of an apparatus to which resources on the air interface are allocated and assigned, and thus any feature described herein with a device may be implemented with a corresponding apparatus, such as a relay node. An example of such a relay node is a layer 3 relay (self-backhauling relay) towards the base station.

The device typically refers to a device (e.g. a portable or non-portable computing device) that includes wireless mobile communication devices operating with or without an universal subscriber identification module (USIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink only device, of which an example is a camera or video camera loading images or video clips to a network. A device may also be a device having capability to operate in Internet of Things (IoT) network which is a scenario in which objects are provided with the ability to transfer data over a network without requiring human-to-human or human-to-computer interaction, e.g. to be used in smart power grids and connected vehicles. The device may also utilise cloud. In some applications, a device may comprise a user portable device with radio parts (such as a watch, earphones or eyeglasses) and the computation is carried out in the cloud. The device (or in some embodiments a layer 3 relay node) is configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected information and communications technology, ICT, devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, e.g. below 6 GHz or above 24 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, 6 or above 24 GHz-cmWave and mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks 112, such as a public switched telephone network, or a VoIP network, or the Internet, or a private network, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

The technology of Edge cloud may be brought into a radio access network (RAN) by utilizing network function virtualization (NFV) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at or close to a remote antenna site (in a distributed unit, DU 108) and non-real time functions being carried out in a centralized manner (in a centralized unit, CU 110).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano) satellites are deployed). Each satellite in the mega-constellation may cover several satellite-enabled network entities that create on-ground cells. The on-ground cells may be created through an on-ground relay node or by a gNB located on-ground or in a satellite.

It is obvious for a person skilled in the art that the depicted system is only an example of a part of a radio access system and in practice, the system may comprise a plurality of (e/g) NodeBs, the device may have an access to a plurality of radio cells and the system may comprise also other apparatuses, such as physical layer relay nodes or other network elements, etc. At least one of the (e/g) NodeBs or may be a Home (e/g) nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g) NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g) NodeBs are required to provide such a network structure.

For fulfilling the need for improving the deployment and performance of communication systems, the concept of "plug-and-play" (e/g) NodeBs has been introduced. Typically, a network which is able to use "plug-and-play" (e/g) Node Bs, includes, in addition to Home (e/g) NodeBs (H (e/g) nodeBs), a home node B gateway, or HNB-GW (not shown in FIG. 1). A HNB Gateway (HNB-GW), which is typically installed within an operator's network may aggregate traffic from a large number of HNBs back to a core network.

Figure 2:
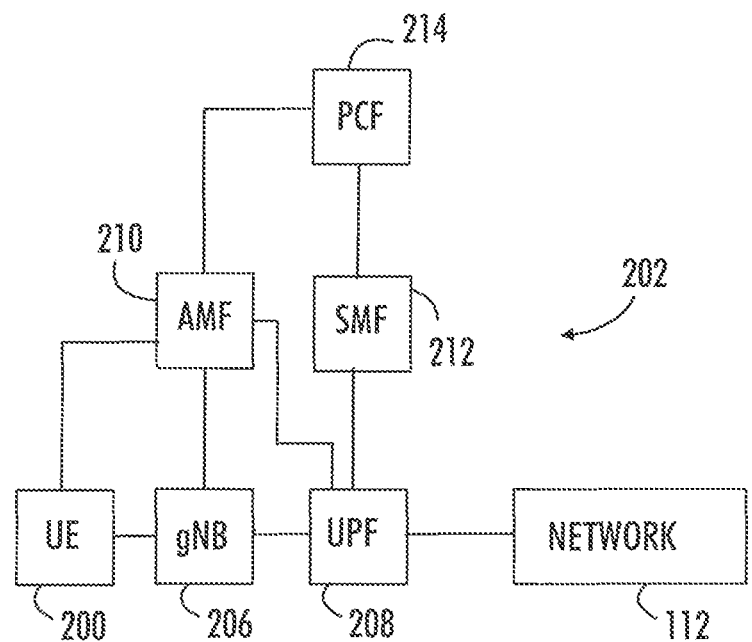

FIG. 2 illustrates an example of a communication system based on 5G network components. A user terminal or user equipment 200 communicating via a 5G network 202 with a data network 112. The user terminal 200 is connected to a Radio Access Network RAN node, such as (e/g) NodeB 206 which provides the user terminal a connection to the network 112 via one or more User Plane Functions 208. The user terminal 200 is further connected to Core Access and Mobility Management Function, AMF 210, which is a control plane core connector for (radio) access network and can be seen from this perspective as the 5G version of Mobility Management Entity, MME, in LTE. The 5G network further comprises Session Management Function, SMF 212, which is responsible for subscriber sessions, such as session establishment, modify and release, and a Policy Control Function 214 which is configured to govern network behavior by providing policy rules to control plane functions.

Each user terminal (or user equipment, UE) hardware has unique identifier. The identifier may be denoted as the permanent equipment identifier, PEI, or international mobile equipment identifier, IMEI.

A user terminal wishing to utilise services of a wireless communication system such as a cellular network, needs to have a subscription from the operator of the communication system. Typically, a subscription is bounded to a physical Universal Subscriber Identity Module, USIM, card and the subscription can be identified by a unique subscription permanent identifier, SUPI, denoted also an international mobile subscriber identity, IMSI. SUPI consists of the mobile country code (MCC), mobile network code (MNC), and the mobile subscription identification number (MSIN).

There are also so-called embedded USIMs or electronic SIMs, eSIM, available. An eSIM is a digital USIM that allows the owner to activate a subscription to a communication system without having to use a physical USIM card.

In most cases, a user terminal has only one subscriber identity, stored in the USIM card inserted in the terminal. However, there are numerous user terminals on the market which have more than one slot for USIM cards and are capable of supporting multiple subscriber identities. Those user terminals may be denoted as multi-USIM (MUSIM) devices.

While a MUSIM device has a separate SUPI corresponding to each of its USIM cards it should only have a unique permanent equipment identifier, PEI referring to the device hardware itself. However, currently there is no requirement preventing a MUSIM device to have more than one PEI as well. Hence, some MUSIM device vendors have chosen to specify two (or more) distinct PEIs as well. This will currently prevent the communication systems to apply PEI as an indicator for MUSIM devices. Therefore, the communication systems are unable to easily determine whether a user terminal hardware comprises a multitude of subscriber identities.

Thus, an MUSIM user terminal has two (dual) or more (multiple) simultaneous network subscriptions and may also have multiple corresponding PEIs each associated with a particular USIM belonging to the same or different Mobile Network Operator, MNO, or Mobile Network Virtual Operator, MNVO.

In case the two USIMs belong to the same MNO/MVNO, registered with two independent ID's at the core network, they may be using the same cell or two neighbour cells as serving cell (where this later case can occur if the user terminal is at the edge between two or more cells and due to load balancing or the handover procedures one USIM gets assigned to a cell while the other USIM gets assigned to another). Typically, though, it is more probable that the USIMs of the same operator are located in a same cell as the mobility and location in a cell is identical for both USIMs. In case the two USIMs belong to different MNOs they may be using two neighbouring or co-located cells from each MNO as serving cell.

A MUSIM user terminal may be registered to the network and be in any of the RRC states RRC_idle, RRC_inactive, or RRC_connected with one or more subscription identities. When the network infrastructure is not aware that these multiple subscription identities are co-located in the same MUSIM device, the network will be unable to optimize certain procedures and instead will treat each subscription identity of the user terminal independently.

MUSIM user terminals may cause degradation towards the network when they have to share the same resources at the user terminal (such as radio frequency, RF, frontend and baseband, for example). Thus, multiplexing support of services across two networks might become challenging. However, the user terminal must still be able to maintain two subscriptions with the best possible user experience despite the performance compromises associated with MUSIM operation.

A single USIM UE device compliant to carrier aggregation (CA) and Dual Connectivity (DC) or diversity/MIMO (Multiple Input Multiple Output) requirements has already several receiver RX and transmitter TX chains (typically 5-8 RX and 3-4 TX). However, it is not capable of supporting 5-8 parallel independent RX nor 3-4 parallel independent TX due to one or several of the below given reasons or other hardware limitations.

Depending on the radiofrequency hardware, RF HW, design not all RX and TX chains cover the full range of frequencies—i.e. Low Band (LB), Mid Band (MB), High Band (HB), Ultra High Band (UHB), and millimeter-wave (mmW)—used in cellular communication and support of MIMO.

Depending on the RF HW design Front-end components are shared for carriers in same band-group.

Intermodulation products across several RX frequencies and TX frequencies as well as the local oscillator generates continuous waveform (CW) as well as modulated spurious which acts as interference for the received signals. In-device self-interference cancellation is applied to cancel generated CW & modulated spurs. However, it needs dynamic time-accurate synchronized knowledge on RX and TX LOs.

Due to strict requirements on device size and weight as well as battery lifetime the MUSIM user terminals will in most cases utilize the same single USIM HW for multi-USIM operation by sharing the RX and TX chains across the two USIM.

MUSIM user terminals are usually divided into two main types depending on the supported simultaneous RRC_states on the USIMs.

First, Dual SIM Dual Standby (DSDS) or Multi USIM Multi Standby (MUMS) devices are registered with two or more independent subscriber IDs (USIMs) and can be in RRC_IDLE mode on all USIMs. However, it can only be on RRC_CONNECTED mode with a single USIM at a given time.

Second, Dual SIM Dual Active (DSDA) or Multi USIM Multi Active (MUMA) MUSIM devices are registered with two or more independent subscriber IDs (USIMs) and can be in RRC_IDLE mode on all USIMs. Further, the device can maintain RRC_CONNECTED mode activities on all USIMs.

In addition, behaviour of a MUSIM device with respect to the simultaneous handling of multiple USIMs may depend on the capabilities of the terminal. Three types may be defined as follows:

Type 1: SingleRx/SingleTx: The terminal is only capable of receiving traffic from one network and and/or transmitting traffic to one network at a time.

Type 2: DualRx/SingleTx: The terminal is capable of simultaneously receiving traffic from two networks but can transmit to only one network at a time.

Type 3: DualRx/DualTx: The terminal is capable of simultaneously receiving and/or transmitting to/from two networks.

Figure 3A:
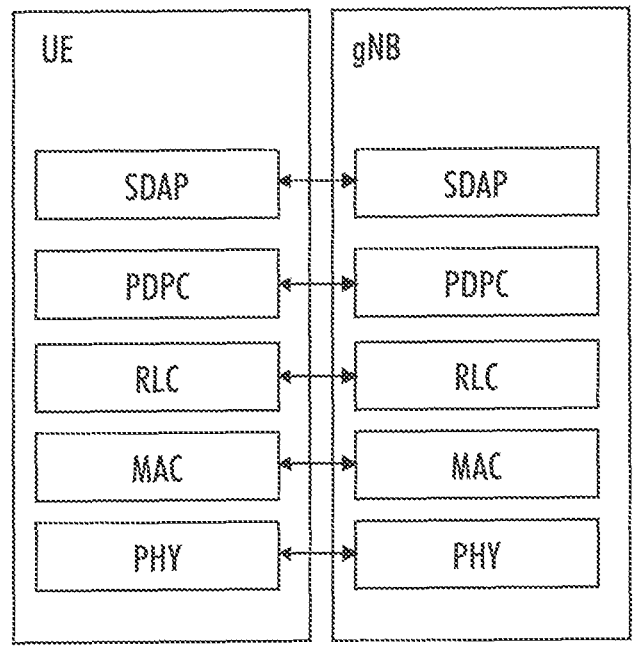
FIGS. 3A and 3B illustrate examples of an overview of the 5G or NR radio protocol stack architecture.
Figure 3B:
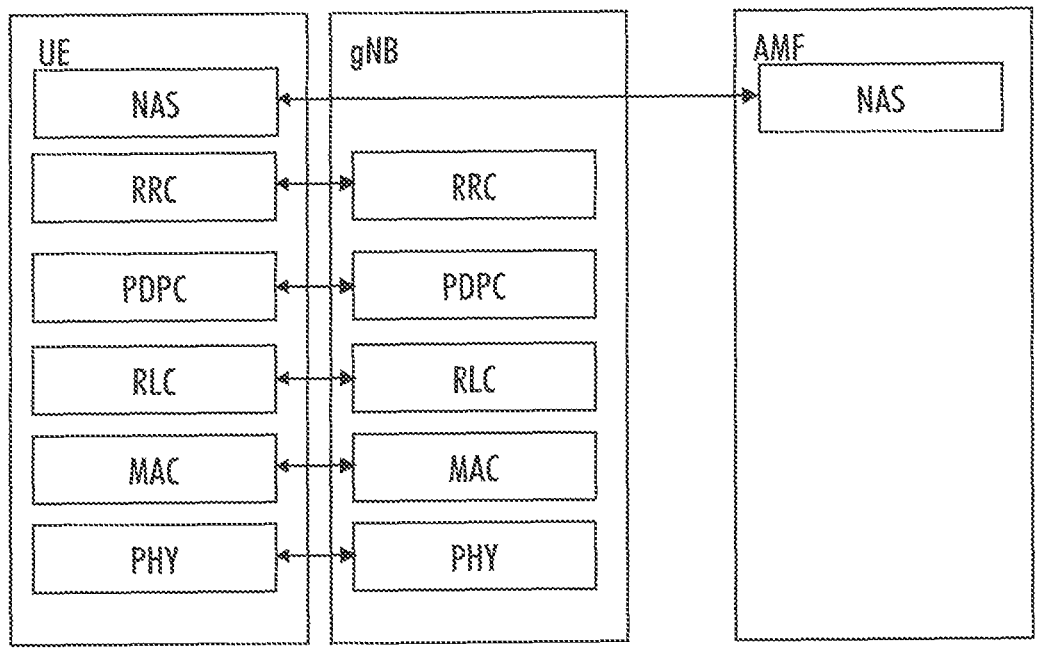

FIGS. 3A and 3B illustrate examples of an overview of the 5G or NR radio protocol stack architecture. NR radio protocol stack has two different stacks depending on the type of data that is processed by the stack. User data goes through the user plane (UP) stack illustrated in FIG. 3A and the signalling messages go through the control plane (CP) stack illustrated in FIG. 3B. Both UP and CP stacks are made up of a common structure: PHY (Physical layer)<->MAC (Medium Access Control)<->RLC (Radio Link Control)<->PDCP (Packet Data Convergence Control), but the components sitting on top of PHY/MAC/RLC/PDCP are different between CP and UP. In case of UP, a layer called Service Data Adaptation Protocol, SDAP, is sitting at the top of the radio stack and is connected to the user plane function, UPF, while in case of CP, the two layers Radio Resource Control, RRC, and Non Access Stratum, NAS, are sitting at the top of the stack and the NAS layer gets connected to the Access and Mobility management Function (AMF).

For simplicity, assume a user terminal having two subscriber identities (USIMs) installed. A singleRx/singleTx terminal will share both RX and TX resources (by time multiplexing, for example) to support the services associated with the USIMs, while a dualRx/singleTx terminal will only need to share its TX resources (by time multiplexing, for example). However, when these types of devices despite their HW limitations are used as DSDA then these devices can, without network knowledge, cause degradation towards the network whenever they have to share the same HW resources at the terminal by time multiplexing the support of services across the two USIMs.

Current MUSIM terminals utilize proprietary implementations. Thus, due to lack of standard support, network lacks any mechanism to control and optimize the terminal behaviour. Currently, whenever a MUSIM device has subscriber identities, these are treated as independent terminals, even in the case where these subscriber identities all belong to the same network provider.

When MUSIM devices having two (or more) subscriber identities from the same network provider camp onto a cell served by a base station, this cell will be applicable for the operation of both subscriber identities. Currently, each subscriber identity is not aware of the serving cell of the other subscriber identity. Thus, a single RX device when having two subscriber identities needs to release the active connection of one of its subscriber identities to be able to start a connection on the other subscriber identity. Alternatively, the network needs to define a time division multiplexing, TDM, pattern for switching between the subscriber identities (although this is currently not possible as the network does not have knowledge if a device is MUSIM nor can control its MUSIM related operations). This is the case since the higher layers of each individual subscriber identity that control the radio link operation are not aware of the presence of another subscriber identity for the same Public Land Mobile Network, PLMN, in the terminal.

Figure 4:
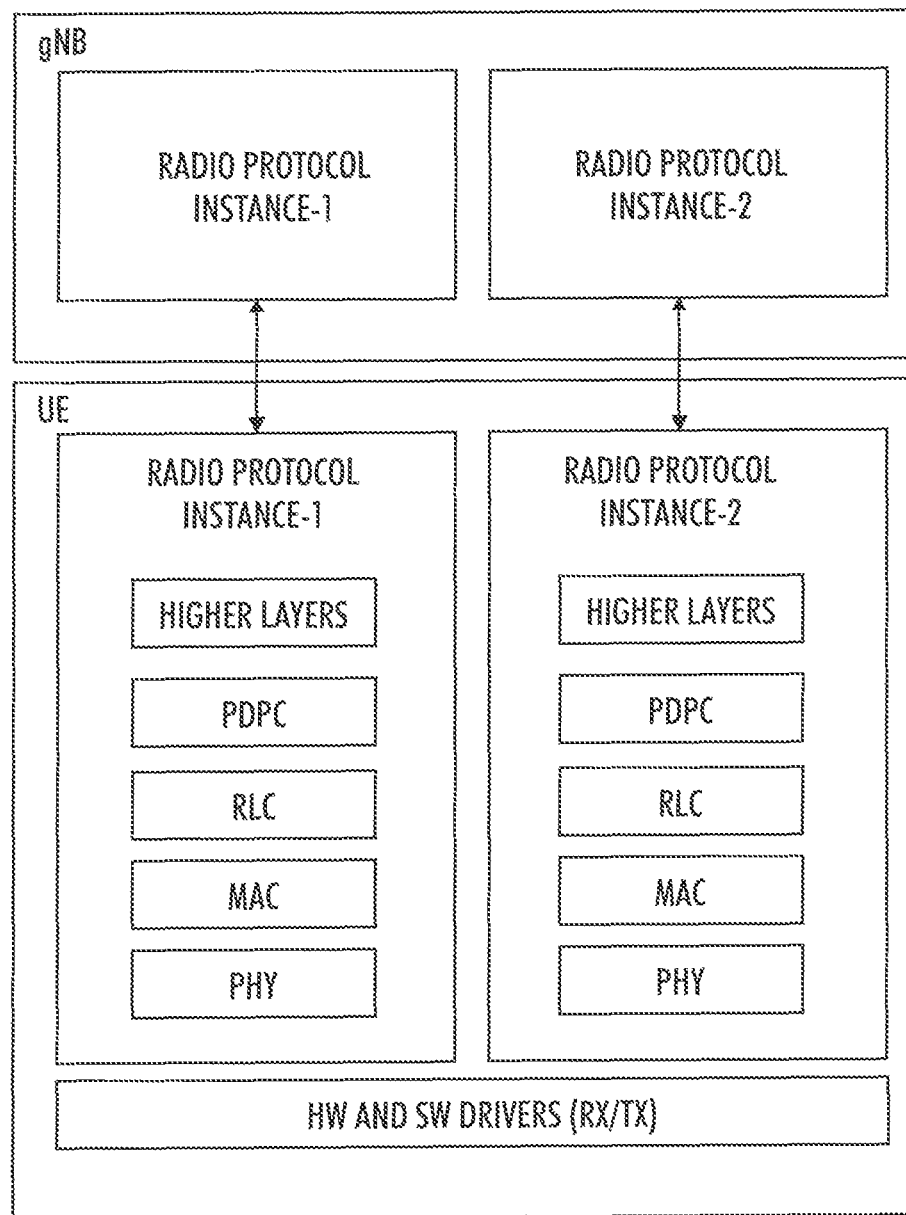
FIG. 4 illustrates an example of a protocol stack architecture in MUSIM terminals.

FIG. 4 illustrates an example of a protocol stack architecture in present MUSIM terminals. Even when a MUSIM user terminal has two subscriber identities from the same vendor and is served by the same cell there will be two complete independent radio protocol stacks running with no alignment between each other.

In case the implementation of a user terminal allows the sharing of information between subscriber identities about the current serving cell, it may be possible that a single RX device can operate in RRC Connected mode at both subscriber identities. However, as this is done transparently from the network, the network will still assume that the subscriber identities of the user terminal correspond to independent user terminals. This assumption can lead to connected mode operations at each subscriber identity that cannot occur simultaneously, or which lead to degraded performance.

Figure 5A:
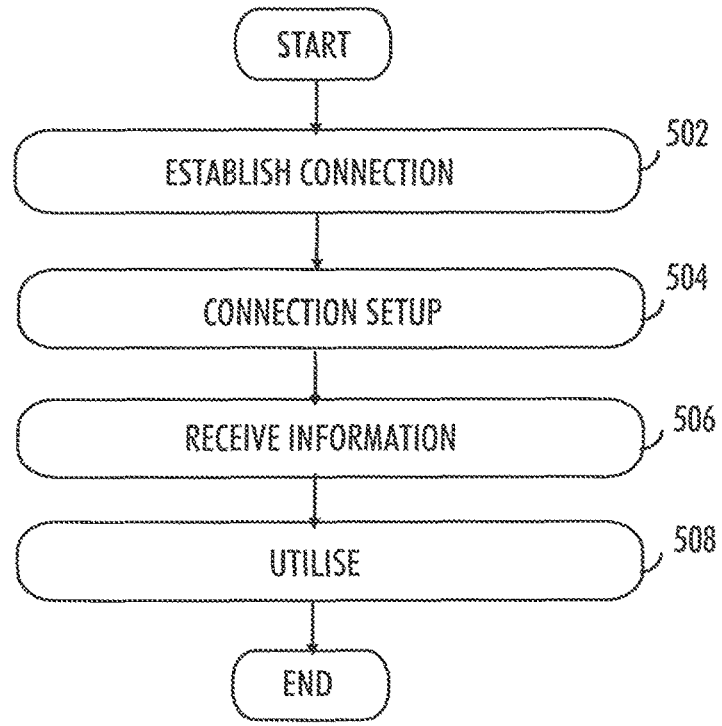
FIGS. 5A, 5B, 6A and 6B, are flowcharts illustrating some embodiments.

The flowchart of FIG. 5A illustrates an embodiment. The flowchart illustrates an example of the operation of an apparatus. In an embodiment, the apparatus may be a MUSIM user terminal, a MUSIM terminal device or any other apparatus capable of executing following steps.

In an embodiment, the terminal device maintains/stores in the terminal device a plurality of subscription identities. The terminal device may have multiple USIMs installed, for example. Thus, it is a MUSIM device.

In step 502, the terminal device is configured to establish a first radio resource connection with a Radio Access Network, RAN, node associated with a first subscription identity of the plurality of subscription identities, the first radio resource connection having a first Radio Network Temporary Identifier, RNTI-1.

In step 504, the terminal device is configured to perform a radio resource connection setup procedure for establishing a second radio resource connection with the RAN node associated with a second subscription identity of the plurality of subscription identities and indicate to the RAN node during or after the radio resource connection set up procedure that the first subscription identity has a radio resource connection with the RAN node.

In step 506, the terminal device is configured to receive a second Radio Network Temporary Identifier, RNTI-2, associated with the second radio resource connection of the second subscription identity and an additional Radio Network Temporary Identifier common to the first and second radio resource connections, RNTI-C.

In step 508, the terminal device is configured to use the common Radio Network Temporary Identifier for communication with the RAN node.

Figure 5B:
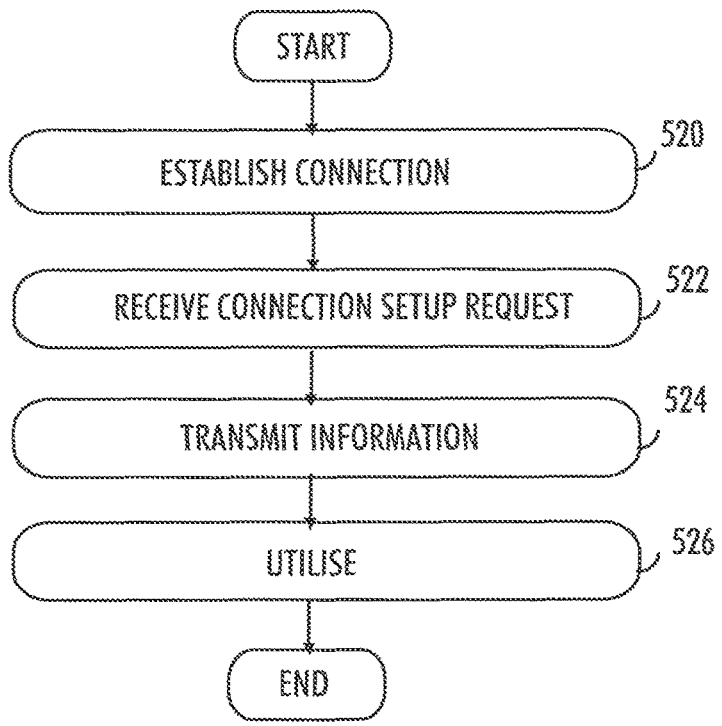

The flowchart of FIG. 5B illustrates an embodiment. The flowchart illustrates an example of the operation of an apparatus. In an embodiment, the apparatus may be a Radio Access Network node, such as an (e/g) gNB, or a part of a RAN node communicating with a MUSIM user terminal device, a MUSIM device or any other apparatus capable of executing steps of FIG. 5A.

In step 520, the apparatus is configured to establish a first radio resource connection associated with a first subscription identity of a terminal device and to assign a Radio Network Temporary Identifier, RNTI-1, for the first radio resource connection;

In step 522, the apparatus is configured to perform a radio resource connection setup procedure for establishing a second radio resource connection associated with a second subscription identity of the terminal device. The apparatus is then configured to receive, during or after the radio resource connection setup procedure, an indication that the terminal device has an existing radio resource connection with the RAN node.

In step 524, the apparatus is configured to assign a Radio Network Temporary Identifier, RNTI-2, for the second radio resource connection and an additional Radio Network Temporary Identifier, common RNTI or RNTI-C, common to the first and second radio resource connections and transmitting the identifiers to the terminal device. In an embodiment, also a Control Region Set, CORESET, common to the first and second radio resource connections is assigned.

In step 526, the apparatus is configured to use the common Radio Network Temporary Identifier, RNTI-C, for communication with the terminal device.

In an embodiment, the proposed solution allows to mitigate performance degradation resulting from a MUSIM apparatus (with singleRx/singleTx or dualRx/singleTx) time multiplexing the downlink and uplink or only uplink services, respectively, on two or multiple active subscription identities belonging to the same network provider. In an embodiment, the network and the apparatus having multiple subscription identities jointly define the elements that allows an efficient sharing of the the hardware resources of the apparatus without inducing network operation degradation.

In an embodiment, when the common RNTI is used for scheduling uplink or downlink, the scheduling message can also indicate whether grant is meant for the first radio resource connection or second radio resource connection.

The scheduling can also include additional information on another grant expected in the same search space.

In an embodiment, the network may also assign a common RNTI even for other RNTI which are used for different purpose than scheduling. For example, the network can assign a common identifier TPC (power control)-RNTI and a slot-format RNTI.

The above described embodiment may be denoted as "common PHY" approach. In an apparatus with multiple subscription identities, one of the identities may be configured to indicate to a gNB as part of RRC connection setup procedure, for instance as part of an RRC SETUP REQUEST or RRC SETUP COMPLETE message, that another RRC connection within the same device is already active and indication that the apparatus supports common PHY operation. In an embodiment, indication can be in another RRC message sent after RRC connection establishment, such as RRC UL INFORMATION TRANSFER message. The gNB (or base station) may be configured to assign common RNTI to schedule the Physical Uplink Shared Channel/Physical Downlink Shared Channel, PUSCH/PDSCH, for both of these RRC connections. The gNB may assign a new common RNTI, to the two RRC connections of the MUSIM terminal device in addition to the RNTIs assigned for individual RRC connections.

The RAN node, base station or gNB may be configured to indicate to the MUSIM terminal device to switch between common RNTI to individual RNTI depending on status of the operation of the subscription identities of the terminal.

The RAN node, base station or gNB may be further configured to include additional information in Downlink Control Information, DCI, encoded by means of the common RNTI, to indicate to the terminal device if the DL or UL grant is meant for a specific subscription identity within the MUSIM terminal.

The use of the common RNTI for scheduling the MUSIM terminal allows the gNB to manage the active connections of both subscription identities in a flexible manner.

Figure 6A:
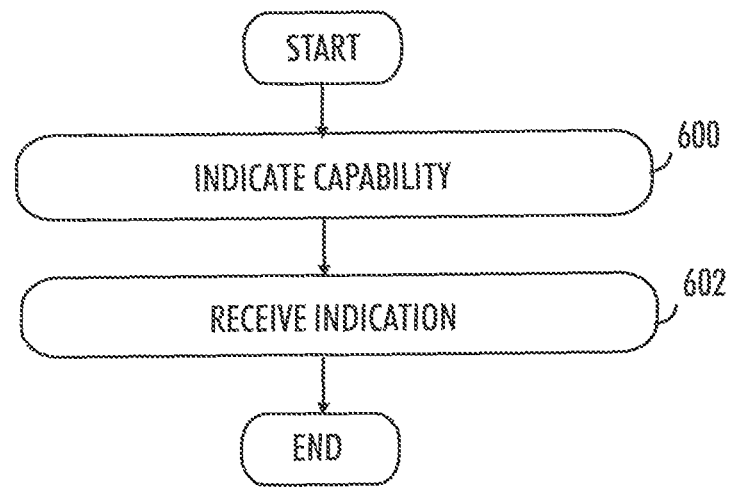

In an embodiment, a common PHY/MAC approach may be built on top of the common PHY approach steps described above. The flowchart of FIG. 6A illustrates an example of this embodiment. The flowchart illustrates an example of the operation of an apparatus. In an embodiment, the apparatus may be a MUSIM user terminal, a MUSIM terminal device or any other apparatus capable of executing the following steps.

In step 600, the apparatus is configured to, when performing the connection setup procedure with the same RAN node for the second subscription identity or after the setup procedure, indicate to the RAN node that the apparatus is capable to share Medium Access Control layer across the radio resource connections of the first and second subscription identities.

In step 602, the apparatus is configured to receive from the RAN node, indication that the Medium Access Control layer is shared across the radio resource connections of the first and second subscription identities.

Figure 6B:
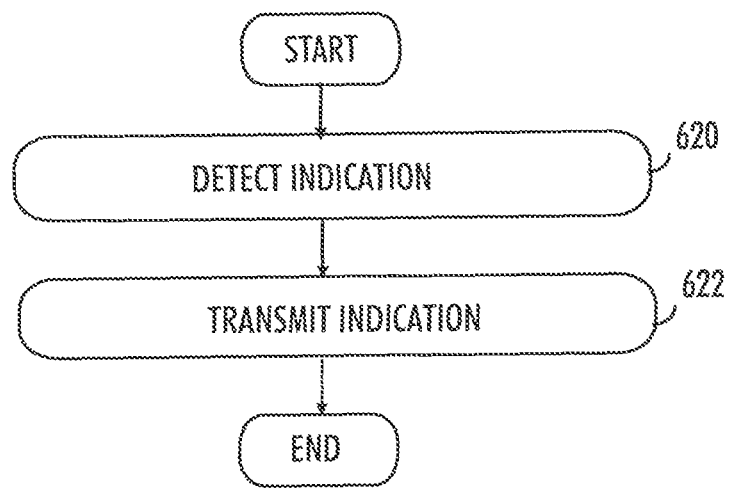

The flowchart of FIG. 6B illustrates this embodiment from network point of view. The flowchart illustrates an example of the operation of an apparatus. In an embodiment, the apparatus may be a RAN node, such as an (e/(g) Nb, or a part of a RAN node, communicating with a MUSIM user terminal device, a MUSIM device or any other apparatus capable of executing steps of FIG. 6A.

In step 620, the apparatus is configured to detect that a connection setup request for a second subscription identity of the user terminal comprises indication that the user terminal is capable to share Medium Access Control layer across the radio resource connections of the first and second subscription identities. In an embodiment, this step may occur in connection with step 522 above. In an embodiment, the detection may occur after the RRC connection establishment of the second subscription identity.

In step 622, the apparatus is configured to transmit to the user terminal an indication that the Medium Access Control layer is shared across the radio resource connections of the first and second subscription identities.

In an embodiment, the proposed approaches may be applicable for both DSDS and DSDA MUSIM operation and although SingleRx/SingleTx devices are normally not used as DSDA (due to the mentioned performance degradation) the above approaches will make such usage possible.

In prior art, assuming that a MUSIM terminal has two subscription identities, the MUSIM terminal creates two different radio protocol instances for radio network operation for each of the subscription identities. In a singleRx/singleTx or dualRx/singleTx terminal only one of the radio connections of the subscription identities can be in RRC_CONNECTED mode. This is because the RX/TX module will be assigned to only one of the subscription identities, while the other subscription identity needs to be in RRC_IDLE or RRC_INACTIVE mode and monitor downlink using the same RX in a singleRX device, but with some gaps created for other subscription identity to allow sharing of the RX module, or a parallel RX in a dualRX device without gaps in parallel connection.

When a MUSIM terminal has two (or more) subscription identities from the same vendor then it can be assumed that the terminal will have the same serving cell, and thus the same operating frequency, on both subscription identities as the mobility and location in a cell is identical for both subscription identities. This will make it possible to merge DL and/or UL operations of each subscription identity with proper network scheduling provided that the network is aware that the two device's identities belong to the same physical device.

In an embodiment, it is possible to keep separate RRC connection and independent RNTI for each subscription identity in a MUSIM terminal but with optimized scheduling, the scheduler is aware of the coexistence of the two subscription identities in the same terminal and can ensure proper air-interface TDM operation when necessary. In an embodiment, the radio link operations can be further optimised if there is tighter co-ordination between the two radio resource connections for common physical layer and possibly common MAC operations.

In downlink, RX resource sharing, Physical downlink control channel, PDCCH and physical downlink shared channel, PDSCH, can be commonly received by the same RX hardware. In case they cannot be merged and received at the same time the network scheduler may take care of allocating resources at different times, and potentially collect the serialized DL to reduce the on time of the terminal.

In uplink, TX resource sharing, the network scheduler can assign separate physical uplink control channel, PUCCH, and physical uplink shared channel, PUSCH, positions. The uplink may be time-multiplexed in a network controlled and flexible way as compared to the existing solutions with fixed or less flexible TDM at terminal side without network knowledge.

Figure 7:
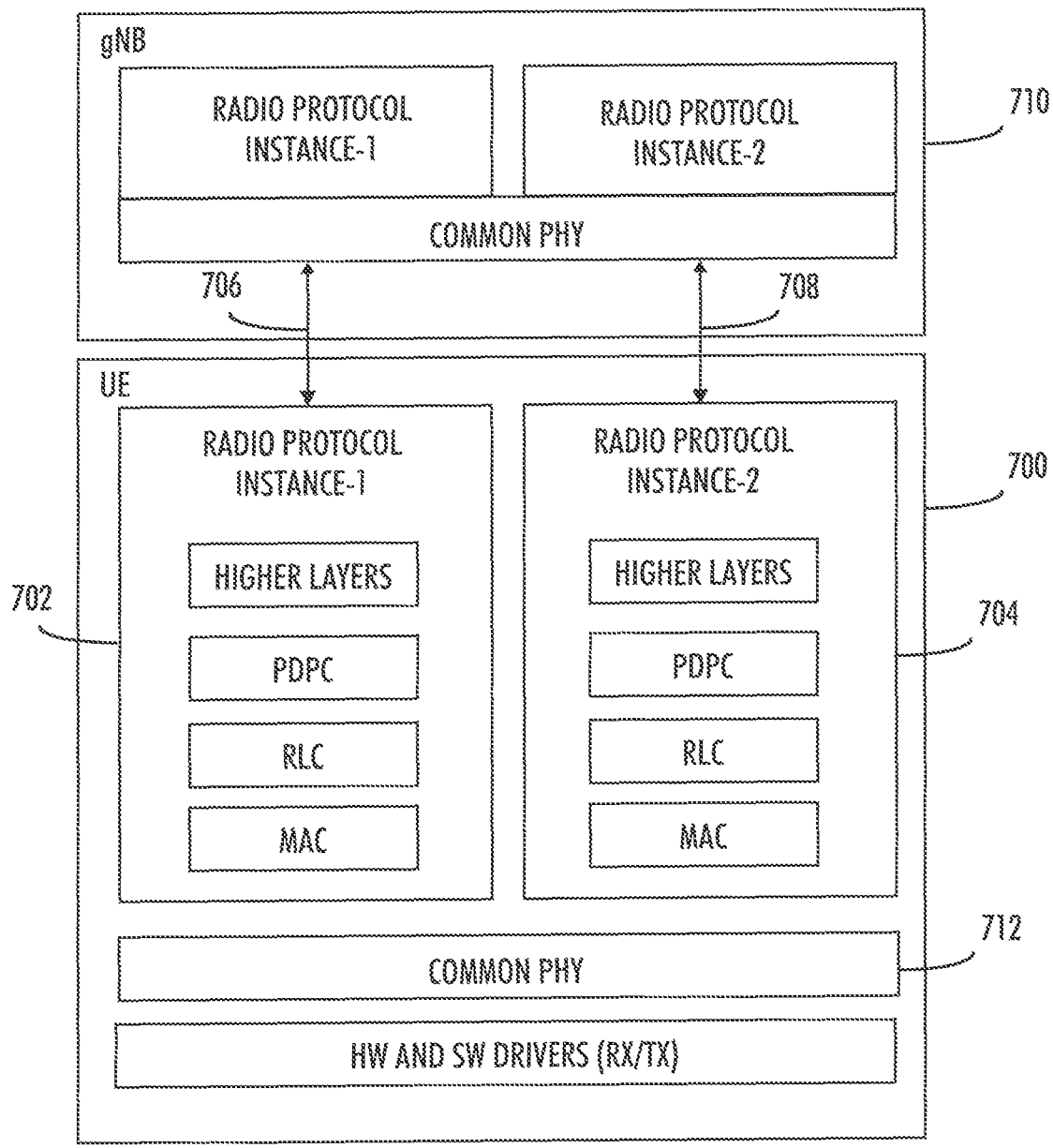
FIG. 7 illustrates an example of a protocol stack architecture in a MUSIM terminal when common physical layer approach is utilised.

FIG. 7 illustrates an example of a protocol stack architecture in MUSIM terminal when the common PHY approach is utilised. The example assumes the MUSIM terminal 700 has two radio protocol stack instances 702, 704, respectively associated with two subscription identities, but the approach may be utilised in a similar manner if there are more than two subscription identities in a terminal. The two RRC connections 706, 708 with the gNB 710 utilise co-ordination for common physical layer 712 operations.

Figure 8A:
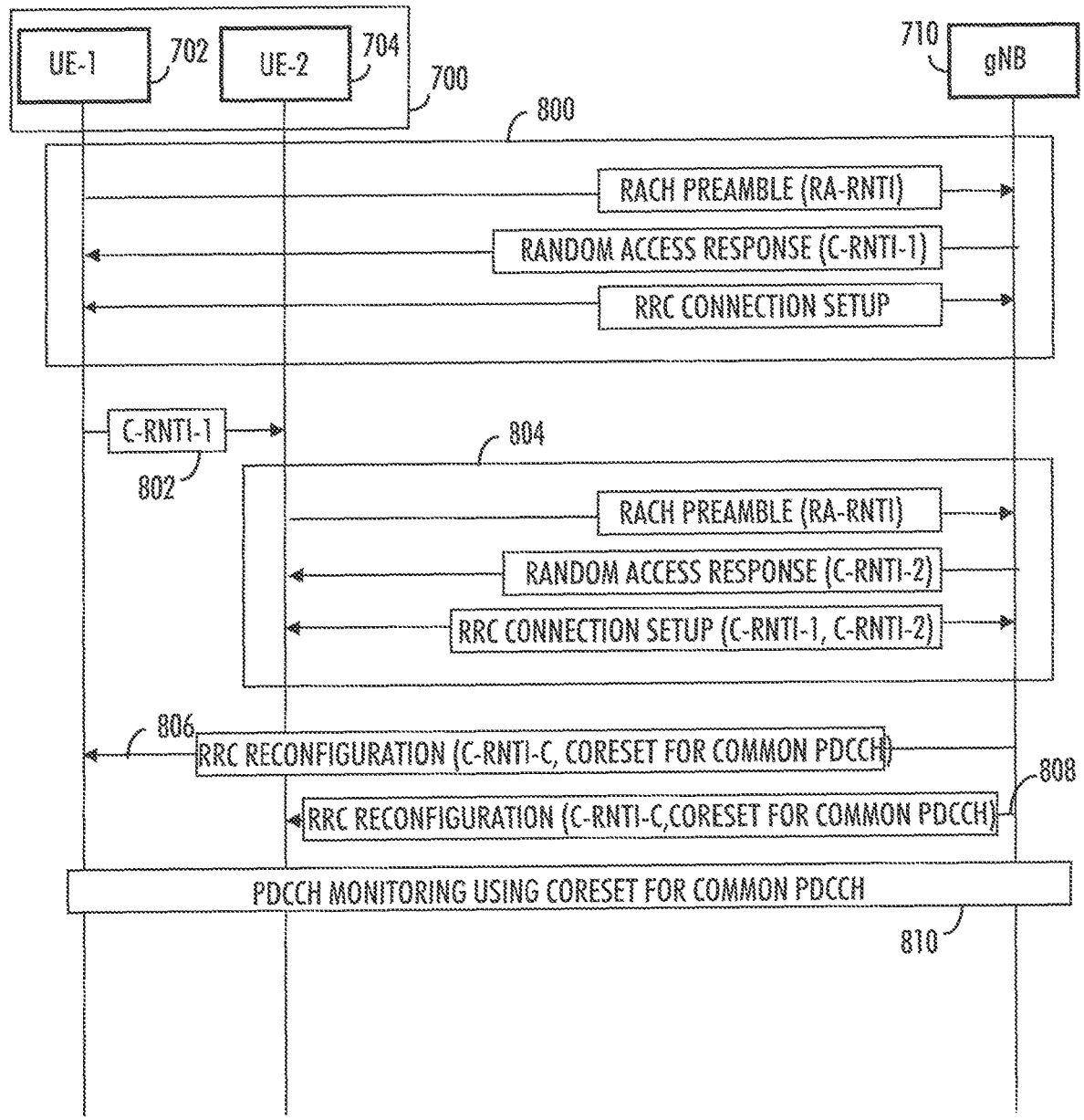
FIGS. 8A and 8B are signalling charts illustrating embodiments.

FIG. 8A is a signalling chart illustrating an embodiment of the common PHY approach. The chart illustrates signalling between the gNB 710 and two radio protocol instances 702, 704 of the terminal 700 associated with two active subscription identities.

The first radio protocol instance 702 performs RACH access and RRC connection establishment 800 with the gNB 710, moves to RRC_connected mode, and performs network registration with the first subscriber identity through NAS signalling. The gNB transmits an RNTI (temporary C-RNTI-1) to the radio protocol instance 702.

In an embodiment, the first radio protocol instance 702 may inform 802 the second radio protocol instance 704 about the received RNTI (C-RNTI-1).

At some later point of time, the second radio protocol instance 704 performs RRC connection establishment 804 to the gNB, enters RRC_connected mode, and performs network registration with the second subscriber identity through NAS signalling. During RRC connection establishment it informs that it shares the same RX/TX with the earlier radio resource connection which has the C-RNTI-1.

Based on this information, the gNB 710 assigns 804 a dedicated RNTI (temporary C-RNTI-2) to the second radio protocol instance 704. Further, the gNB 710 assigns and transmits a common RNTI (C-RNTI-C) for common physical layer operation via RRC reconfiguration 806, 808 of each of the radio protocol instances 702, 704. In addition, with common RNTI, a common CORESET is configured for common PDCCH operation.

Both connections switch 810 to monitor common RNTI in the corresponding CORESET once the common RNTI information is exchanged via RRC reconfiguration signalling.

In an embodiment, the gNB may switch to individual PDCCH operation via a DCI command.

In an embodiment, the PDCCH may comprise an additional field to indicate whether a scheduled PDSCH or PUSCH is for a specific RNTI. PDCCH may also indicate whether there will be another PDCCH for the same common RNTI in the current search space.

Figure 8B:
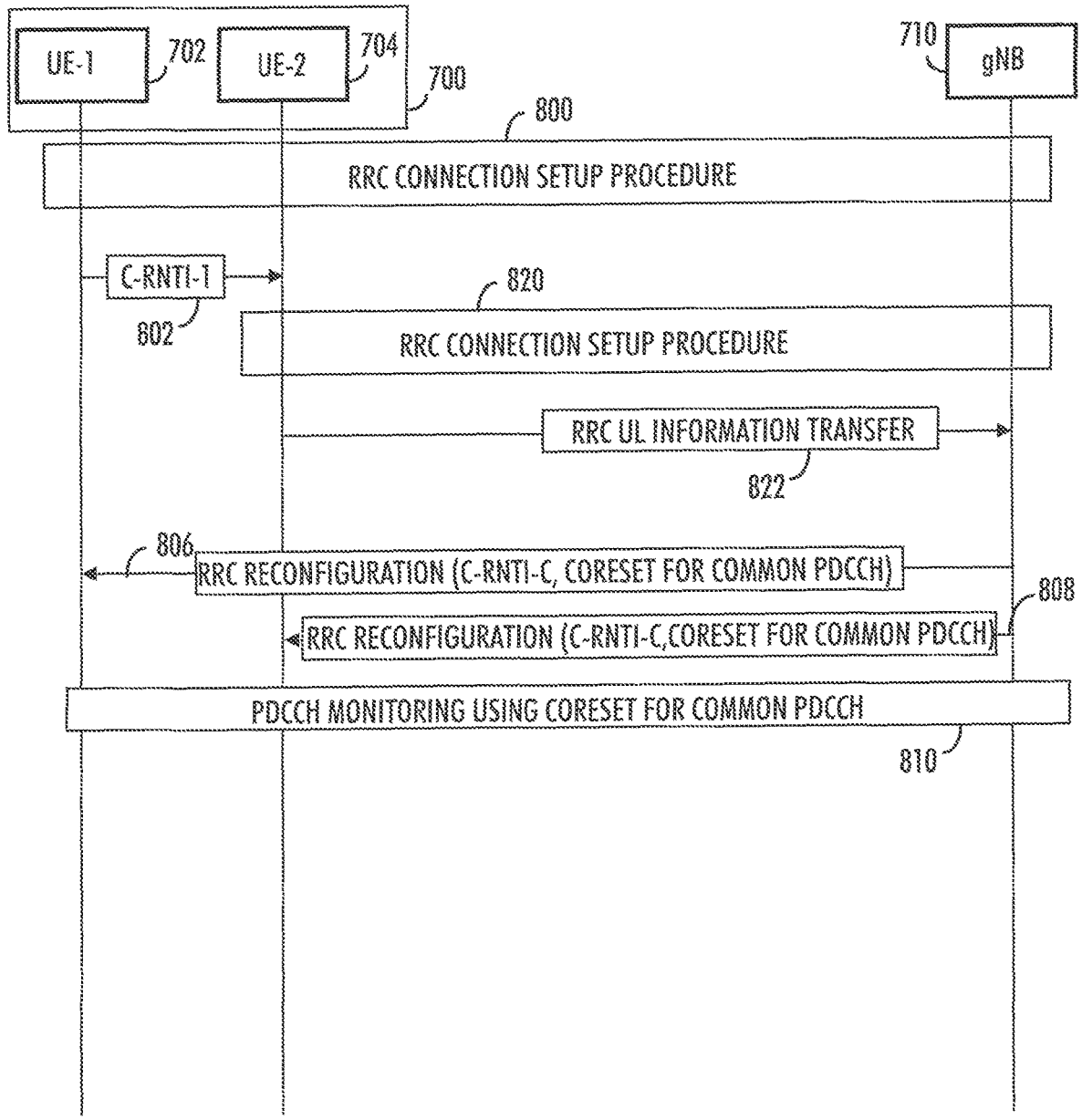

FIG. 8B is a signalling chart illustrating an embodiment of the common PHY approach. In an embodiment, the first radio protocol instance 702 performs RRC connection establishment 800 with the gNB 710 as described above. Next, at some later point of time, the second radio protocol instance 704 performs RRC connection establishment 820 to the gNB. At some later point of time, the terminal 700 transmits 822 after the above RRC connection setup procedures an indication for an existing RRC connection as part of another subsequent RRC message, such as an RRC UL INFORMATION TRANSFER message, for example. The gNB 710 may then assign and transmit a common RNTI (C-RNTI-C) for common physical layer operation via RRC reconfiguration 806, 808 of each of the radio protocol instances 702, 704. In addition, with common RNTI, a common CORESET may be configured for common PDCCH operation. Both connections switch 810 to monitor common RNTI in the corresponding CORESET once the common RNTI information is exchanged via RRC reconfiguration signalling.

Figure 9:
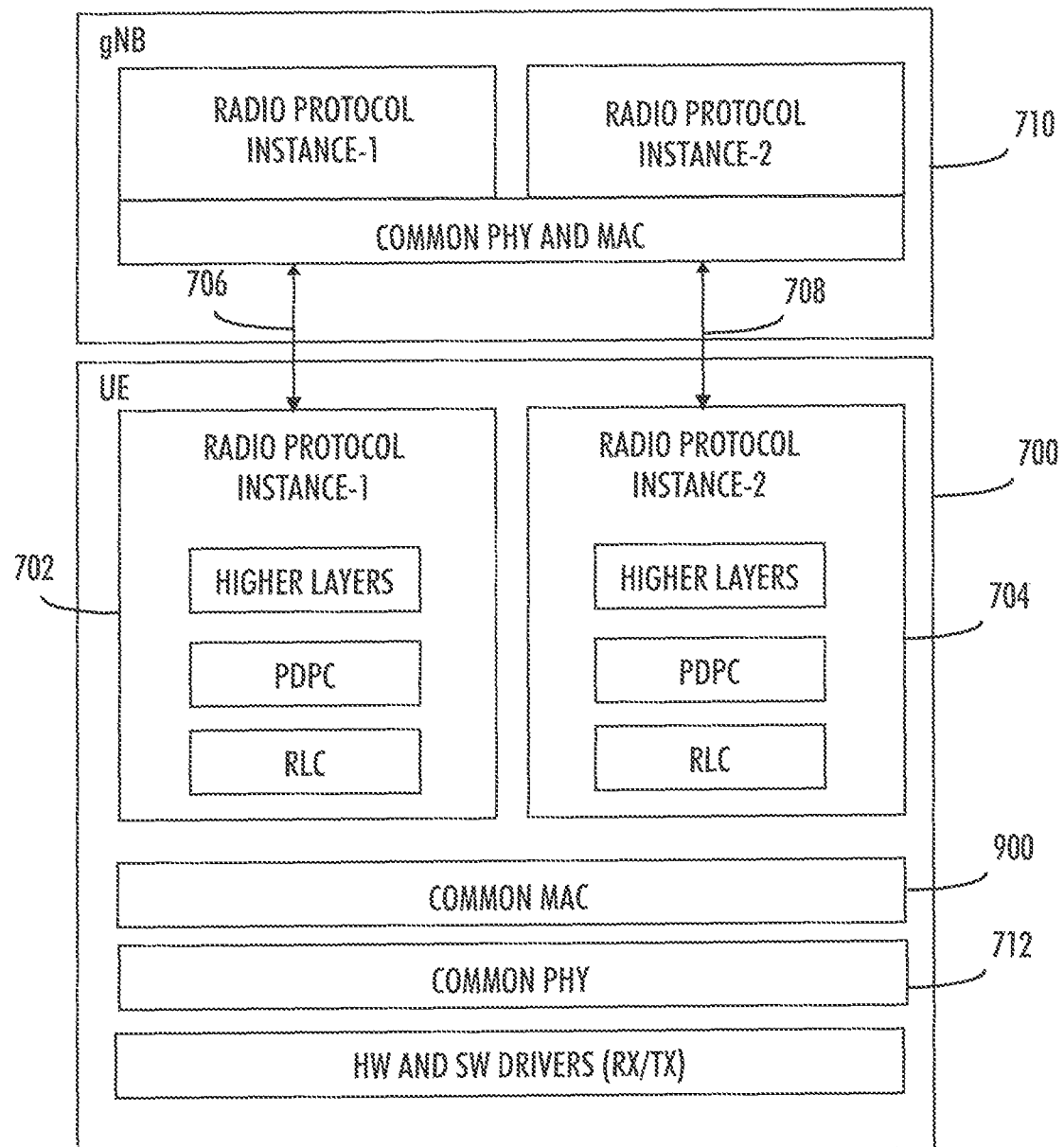
FIG. 9 illustrates an example of a protocol stack architecture in a MUSIM terminal when common physical layer/medium access control layer approach is utilised.

FIG. 9 illustrates an example of a protocol stack architecture in MUSIM terminal when the common PHY/MAC approach is utilised. Again, the example assumes the MUSIM terminal 700 has two radio protocol instances 702, 704 associated with two subscription identities, but the approach may be utilised in a similar manner if there are more than two subscription identities in a terminal. The two RRC connections 706, 708 of the two radio protocol instances 702, 704 with the gNB 710 utilise co-ordination for common physical layer 712 and MAC 900 operations.

Figure 10A:
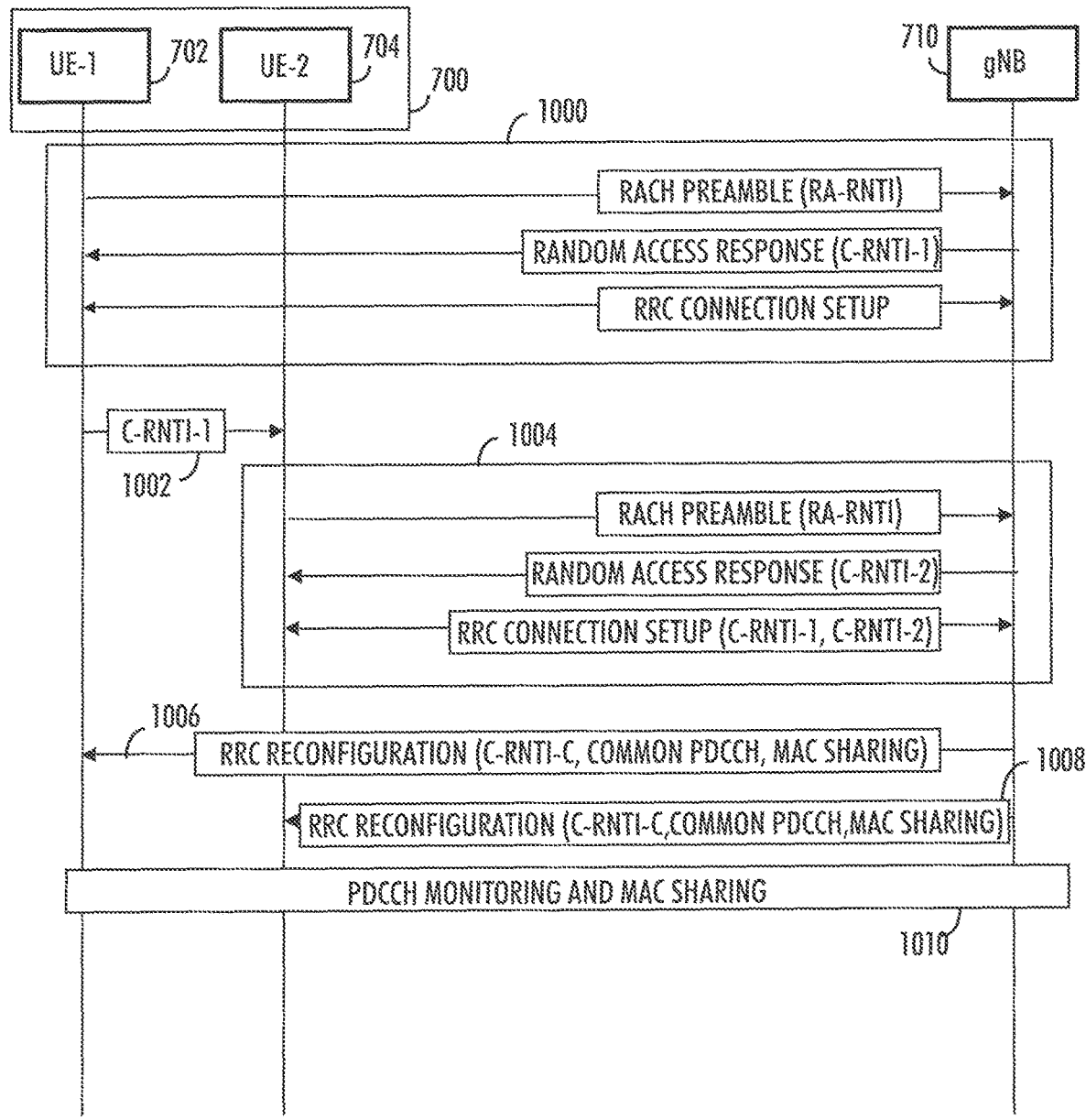
FIGS. 10A and 10B are signalling charts illustrating embodiments.

FIG. 10A is a signalling chart illustrating an embodiment of the common PHY/MAC approach. The chart illustrates signalling between two radio protocol instances 702, 704 associated with two subscription identities and the gNB 710.

The first radio protocol instance 702 performs connection establishment to the gNB, moves to RRC_connected mode, registers to the network with the first subscription identity, and receives an RNTI (temporary C-RNTI-1) 1000.

In an embodiment, the first radio protocol instance 702 may inform 1002 the second radio protocol instance 704 about the received RNTI.

At some later point of time, the second radio protocol instance 704 performs connection establishment to the gNB, enters RRC_connected mode and registers to the network 1004. During connection establishment it informs that it shares the same RX/TX with the earlier RRC connection which has C-RNTI-1. In addition, it informs about its capability to share MAC across two RRC connections.

The gNB 710 assigns 1004, at least in part based on the above information, a dedicated RNTI (temporary C-RNTI-2) to the second subscription identity 704. Further, the gNB assigns 1006, 1008 a common RNTI (C-RNTI-C) for common physical layer scheduling and MAC sharing and transmits information on the common RNTI to the radio protocol instances 702, 704. Further, the gNB indicates that the MAC configuration of the first RRC connection is shared between the first and second RRC connections. Both connections switch 1010 to monitor common RNTI in the corresponding CORESET and start MAC sharing once the common RNTI information is exchanged via RRC reconfiguration signalling.

Figure 10B:
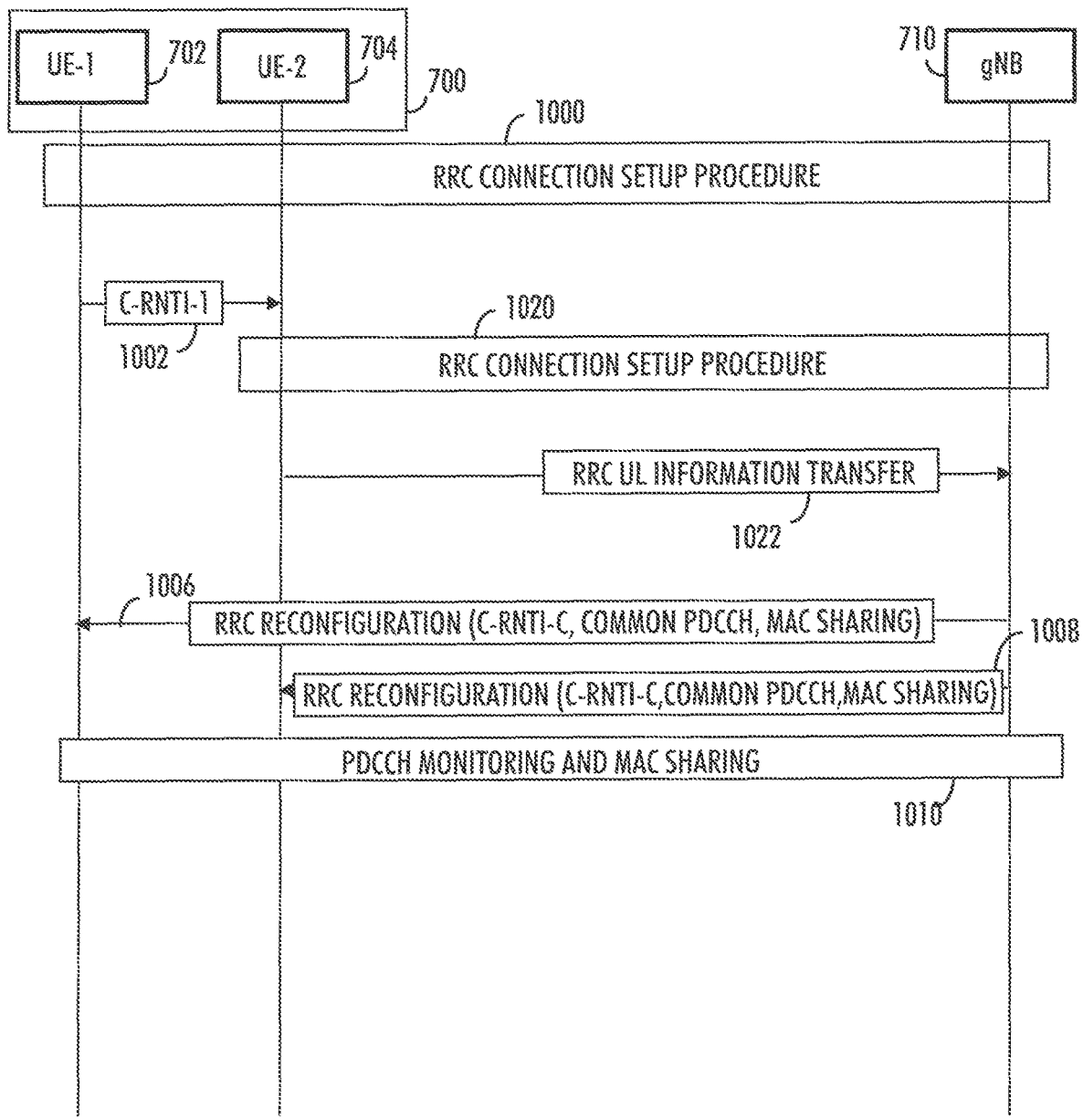

FIG. 10B is a signalling chart illustrating an embodiment of the common PHY/MAC approach. In an embodiment, the first radio protocol instance 702 performs connection establishment 1000 to the gNB. At some later point of time, the second radio protocol instance 704 performs connection establishment 1020 to the gNB. At some later point of time, the terminal 700 transmits 1022 after the above RRC connection setup procedures an indication for MAC sharing, as part of another RRC message, such as an RRC UL INFORMATION TRANSFER message, for example. The gNB then assigns 1006, 1008 a common RNTI (C-RNTI-C) for common physical layer scheduling and MAC sharing and transmits information on the common RNTI to the radio protocol instances 702, 704. Further, the gNB indicates that the MAC configuration of the first RRC connection is shared between the first and second RRC connections. Both connections switch 1010 to monitor common RNTI in the corresponding CORESET and start MAC sharing once the common RNTI information is exchanged via RRC reconfiguration signalling.

In an embodiment, common MAC between the subscription identities of the MUSIM terminal are configured in the device and the gNB.

In an embodiment, the terminal transmits buffer status report (BSR) information sent separately for the logical channels of the first and second subscription identities.

In an embodiment, MAC packet data unit, PDU, contains additional bit for terminal identification along with logical channel ID (LCID) so that the radio bearer traffic is separated to radio protocol stack of the respective subscription identities.

In an embodiment, the gNB may switch to individual PDCCH and MAC operation via a DCI command.

Figure 11:
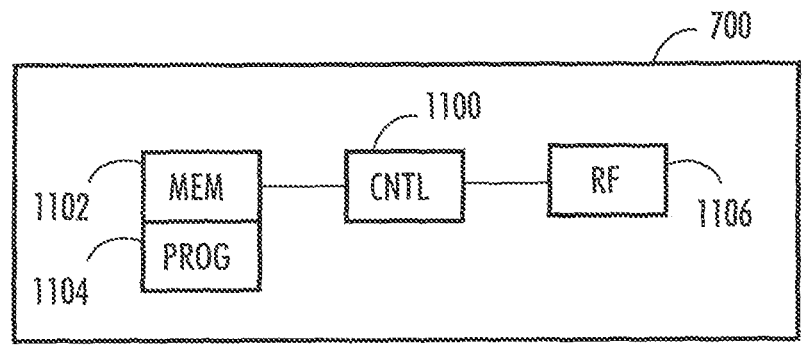
FIGS. 11, 12 and 13 illustrate simplified examples of apparatuses applying some embodiments of the invention.

FIG. 11 illustrates an embodiment. The figure illustrates a simplified example of an apparatus applying embodiments of the invention. In some embodiments, the apparatus may be a terminal, or a part of a terminal maintaining in the terminal more than one subscription identities. The apparatus may be a user terminal or an IoT device, for example.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus 700 of the example includes a control circuitry 1100 configured to control at least part of the operation of the apparatus.

The apparatus may comprise a memory 1102 for storing data. Furthermore, the memory may store software 1104 executable by the control circuitry 1100. The memory may be integrated in the control circuitry.

The apparatus may comprise one or more interface circuitries 1106, The interface circuitries are operationally connected to the control circuitry 1100. An interface circuitry 1106 may be a set of transceivers configured to communicate with a RAN node, such as an (e/g) NodeB of a wireless communication network. The interface circuitry 1106 has the capability to support multiple subscription identities. In an embodiment, the interface may support more than one of the subscription identities to be in an RRC_connected state at the same time. The interface circuitry may be connected to an antenna arrangement (not shown). The apparatus may also comprise a connection to a transmitter instead of a transceiver. The apparatus may further comprise a user interface.

In an embodiment, the software 1104 may comprise a computer program comprising program code means adapted to cause the control circuitry 1100 of the apparatus to realise at least some of the embodiments described above.

Figure 12:
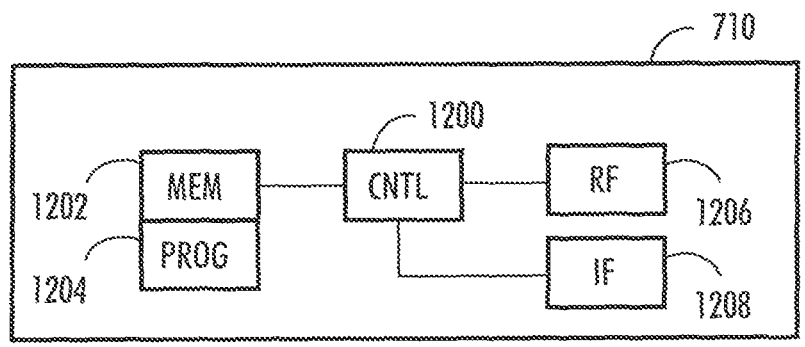

FIG. 12 illustrates an embodiment. The figure illustrates a simplified example of an apparatus or network element applying embodiments of the invention. In some embodiments, the apparatus may be a RAN node, such as an (e/g) NodeB or a part of a RAN node.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus 710 of the example includes a control circuitry 1200 configured to control at least part of the operation of the apparatus.

The apparatus may comprise a memory 1202 for storing data. Furthermore, the memory may store software 1204 executable by the control circuitry 1200. The memory may be integrated in the control circuitry.

The apparatus further comprises one or more interface circuitries 1206, 1208 configured to connect the apparatus to other devices and network elements of the radio access network. An interface circuitry 1206 may be a set of transceivers configured to communicate with user terminals. An interface circuitry 1208 may be a set of transceivers configured to communicate with other network elements such as a core network. The interfaces may provide wired or wireless connections.

In an embodiment, the software 1206 may comprise a computer program comprising program code means adapted to cause the control circuitry 1200 of the apparatus to realise at least some of the embodiments described above.

Figure 13:
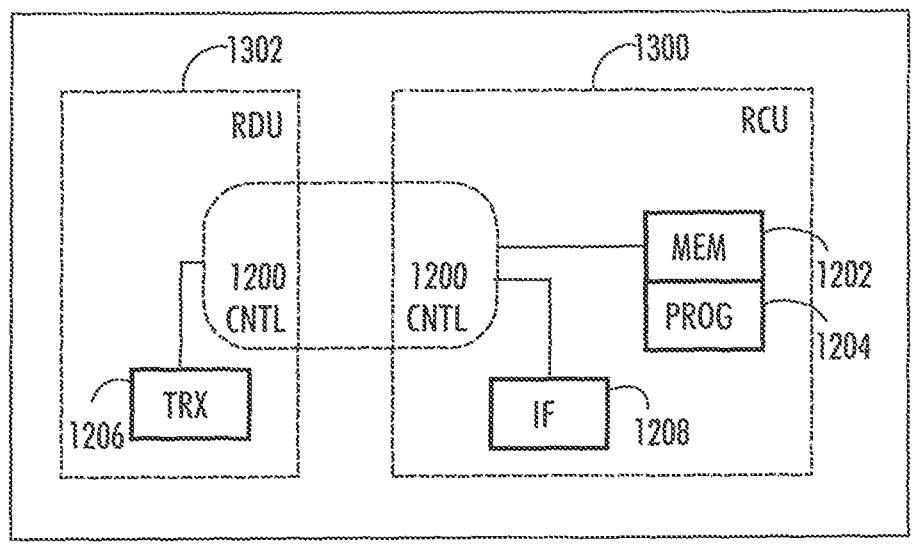

In an embodiment, as shown in FIG. 13, at least some of the functionalities of the apparatus of FIG. 12 may be shared between two physically separate devices, forming one operational entity. Therefore, the apparatus may be seen to depict the operational entity comprising one or more physically separate devices for executing at least some of the described processes. Thus, the apparatus of FIG. 13, utilizing such shared architecture, may comprise a remote control unit RCU 1300, such as a host computer or a server computer, operatively coupled (e.g. via a wireless or wired network) to a remote distributed unit RDU 1302 located in the base station. In an embodiment, at least some of the described processes may be performed by the RCU 1300. In an embodiment, the execution of at least some of the described processes may be shared among the RDU 1302 and the RCU 1300.

In an embodiment, the RCU 1300 may generate a virtual network through which the RCU 1300 communicates with the RDU 1302. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer (e.g. to the RCU). External network virtualization is targeted to optimized network sharing. Another category is internal virtual networking which provides network-like functionality to the software containers on a single system. Virtual networking may also be used for testing the terminal device.

In an embodiment, the virtual network may provide flexible distribution of operations between the RDU and the RCU. In practice, any digital signal processing task may be performed in either the RDU or the RCU and the boundary where the responsibility is shifted between the RDU and the RCU may be selected according to implementation.

The steps and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or controllers able to perform the above-described steps may be implemented as an electronic digital computer, processing system or a circuitry which may comprise a working memory (random access memory, RAM), a central processing unit (CPU), and a system clock. The CPU may comprise a set of registers, an arithmetic logic unit, and a controller. The processing system, controller or the circuitry is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An embodiment provides a computer program embodied on a distribution medium, comprising program instructions which, when loaded into an electronic apparatus, are configured to control the apparatus to execute the embodiments described above.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst several computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

In an embodiment, an apparatus comprises at least one processor; and at least one memory including computer program code, the at least one memory and computer program code configured to, with the at least one processor, cause the apparatus to perform: establish a first radio resource connection with a Radio Access Network (RAN) node associated with a first subscription identity of a plurality of subscription identities, the first radio resource connection having a first Radio Network Temporary Identifier; perform a radio resource connection setup procedure for establishing a second radio resource connection with the RAN node associated with a second subscription identity of a plurality of subscription identities; indicate to the RAN node during the radio resource connection set up procedure that the first subscription identity has a radio resource connection with the RAN node and belongs to the terminal device; receive a second Radio Network Temporary Identifier associated with the second radio resource connection of the second subscription identity and an additional Radio Network Temporary Identifier common to the first and second radio resource connections; and use the common Radio Network Temporary Identifier for communication with the RAN node associated with both the first and second subscription identities.

In an embodiment, an apparatus comprises at least one processor; and at least one memory including computer program code, the at least one memory and computer program code configured to, with the at least one processor, cause the apparatus to perform: establish a first radio resource connection associated with a first subscription identity of a terminal device and assigning a Radio Network Temporary Identifier for the first radio resource connection; receiving a connection setup request for establishing a second radio resource connection associated with a second subscription identity, the request comprising indication that the first subscription identity has a radio resource connection and belongs to the terminal device; assigning a Radio Network Temporary Identifier for the second radio resource connection associated with of the second subscription identity and an additional Radio Network Temporary Identifier common to the first and second radio resource connections and transmitting the identifiers to the terminal device; and use for communication the common Radio Network Temporary Identifier associated with the first and second subscription identities.

It will be obvious to a person skilled in the art that, as the technology advances, the inventive concept can be implemented in various ways. The invention and its embodiments are not limited to the examples described above but may vary within the scope of the claims.

The invention claimed is:

1. A terminal device comprising: at least one processor and at least one memory including a computer program code, the at least one memory and the computer program code configured to, with the at least one processor, cause the terminal device at least to: establish a first radio resource connection with a Radio Access Network (RAN) node, the first radio resource connection having a first Radio Network Temporary Identifier and being associated with a first subscription identity used by the terminal device to register in a network; perform a radio resource connection setup procedure for establishing a second radio resource connection, the second radio resource ALLOWANCE connection being associated with a second subscription identity used by the terminal device to register in the network; indicate to the RAN node that the terminal device has an existing radio resource connection with the RAN node; receive a second Radio Network Temporary Identifier associated with the second radio resource connection and an additional Radio Network Temporary Identifier common to the first and second radio resource connections; and use a common Radio Network Temporary Identifier for communication with the RAN node wherein the at least one processor and the computer program code are further configured to: indicate to the RAN node that the terminal device is capable to share Medium Access Control layer across the first and second radio resource connections; receive from the RAN node an indication that the Medium Access Control layer is shared between the first and second radio resource connections; and report buffer status information to the RAN node separately for the first and second radio resource connections.

2. The terminal device of claim 1, wherein the at least one processor and the computer program code are further configured to:
receive from the RAN node a message indicating when to start using the common Radio Network Temporary Identifier.

3. The terminal device of claim 2, wherein the message indicates whether there will be another message in a current CORESET and search space associated with the common Radio Network Temporary Identifier.

4. The terminal device of claim 1, wherein the at least one processor and the computer program code are further configured to:
be assigned a CORESET and search space common to the first and second radio resource connections; and
wherein the common Radio Network Temporary Identifier is used by the terminal device for monitoring the common CORESET for control signaling related to the first radio resource connection and/or the second radio resource connection.

5. The terminal device of claim 1, wherein the at least one processor and the computer program code are further configured to:
receive, using the common Radio Network Temporary Identifier for communication with the RAN node, information from the RAN node on radio resource allocation and an indication whether the radio resource allocation is for the first or second radio resource connection.

6. The terminal device of claim 1, wherein the at least one processor and the computer program code means are further configured to:
indicate to the RAN node during the radio resource connection set up procedure that the terminal device has an existing radio resource connection with the RAN node by including the first Radio Network Temporary Identifier in a Radio Resource Control Setup Request message or in a Radio Resource Control Setup Complete message: or
indicate to the RAN node, after the radio resource connection set up procedure, that the terminal device has an existing radio resource connection with the RAN node by including the first Radio Network Temporary Identifier in a Radio Resource Control message.

7. A Radio Access Network (RAN) node comprising:
at least one processor and at least one memory including a computer program code, the at least one memory and the computer program code configured to, with the at least one processor, cause the RAN node at least to:
establish a first radio resource connection with a terminal device and assign a Radio Network Temporary Identifier to the first radio resource connection, the first radio resource connection being associated with a first subscription identity used by the terminal device to register in a network;
perform a radio resource connection setup procedure for establishing a second radio resource connection with the terminal device, the second radio resource connection being associated with a second subscription identity used by the terminal device to register in the network;
receive an indication from the terminal device indicating that the terminal device has an existing radio resource connection with the RAN node;
assign a Radio Network Temporary Identifier to the second radio resource connection and an additional Radio Network Temporary Identifier common to the first and second radio resource connections and transmitting the identifiers to the terminal device; and
use a common Radio Network Temporary Identifier for communication with the terminal device,
wherein the at least one processor and the computer program code are further configured to:
receive, an indication that the terminal device is capable to share Medium Access Control layer across the first and second radio resource connections;
transmit to the terminal device an indication that the Medium Access Control is shared between the first and second radio resource connections; and
receive from the user terminal buffer status information separately for the first and second radio resource connections.

8. The RAN node of claim 7, wherein the at least one processor and the computer program code are further configured to:
transmit to the terminal device a message indicating when to start using the common Radio Network Temporary Identifier.

9. The RAN node of claim 8, wherein the message indicates whether there will be another message in current CORESET and search space associated with the common Radio Network Temporary Identifier.

10. A method performed by a terminal device, comprising:
establishing a first radio resource connection with a Radio Access Network (RAN) node, the first radio resource connection having a first Radio Network Temporary Identifier and being associated with a first subscription identity used by the terminal device to register in a network;
performing a radio resource connection setup procedure for establishing a second radio resource connection, the second radio resource connection being associated with a second subscription identity used by the terminal device to register in the network;
indicating to the RAN node that the terminal device has an existing radio resource connection with the RAN node;
receiving a second Radio Network Temporary Identifier associated with the second radio resource connection and an additional Radio Network Temporary Identifier common to the first and second radio resource connections; and
using a common Radio Network Temporary Identifier for communication with the RAN node,
wherein the method further comprises:
indicating to the RAN node that the terminal device is capable to share Medium Access Control layer across the first and second radio resource connections;
receiving from the RAN node an indication that the Medium Access Control layer is shared between the first and second radio resource connections; and
reporting buffer status information to the RAN node separately for the first and second radio resource connections.

11. A method performed by a Radio Access Network (RAN) node, comprising:
- establishing a first radio resource connection with a terminal device and assigning a Radio Network Temporary Identifier to the first radio resource connection, the first radio resource connection being associated with a first subscription identity used by the terminal device to register in a network;
- performing a radio resource connection setup for establishing a second radio resource connection with the terminal device, the second radio resource connection being associated with a second subscription identity used by the terminal device to register in the network;
- receiving an indication from the terminal device indicating that the terminal device has an existing radio resource connection with the RAN node;
- assigning a Radio Network Temporary Identifier to the second radio resource connection and an additional Radio Network Temporary Identifier common to the first and second radio resource connections and transmitting the identifiers to the terminal device; and
- using a common Radio Network Temporary Identifier for communication with the terminal device, wherein the method further comprises:
- receiving, an indication that the terminal device is capable to share Medium Access Control layer across the first and second radio resource connections;
- transmitting to the terminal device an indication that the Medium Access Control is shared between the first and second radio resource connections; and
- receiving from the user terminal buffer status information separately for the first and second radio resource connections.

* * * * *